United States Patent [19]

Wheatley, Jr.

[11] 3,851,241

[45] Nov. 26, 1974

[54] TEMPERATURE DEPENDENT VOLTAGE REFERENCE CIRCUIT

[75] Inventor: Carl Franklin Wheatley, Jr., Somerset, N.J.

[73] Assignee: RCA Corporation, New York, N.Y.

[22] Filed: Aug. 27, 1973

[21] Appl. No.: 391,664

[52] U.S. Cl. ................ 323/8, 73/362 S C, 307/310, 323/19

[51] Int. Cl. ............................................ G01k 7/00

[58] Field of Search ....... 73/359, 362 S C; 307/310; 323/1, 4, 8, 19, 68; 330/22, 23, 30 D, 69, 127

[56] References Cited

UNITED STATES PATENTS

| | | | |
|---|---|---|---|
| 3,366,889 | 1/1968 | Avins | 330/22 X |
| 3,622,903 | 11/1971 | Steckler | 330/69 X |
| 3,766,444 | 10/1973 | Bosch | 307/310 X |

OTHER PUBLICATIONS

Schlig, "Temperature Tranducer and Thermally Coupled Switch," IBM Technical Disclosure Bulletin, Vol. 12, No. 4, Sept. 1969, pgs. 617, 618.

Dobratz, "Linear Differential Temperature Sensor is Accurate and Simple," Electronic Design, Oct. 24, 1968, pgs. 116, 118.

*Primary Examiner*—A. D. Pellinen

[57] ABSTRACT

A fractional part of a voltage to be regulated is applied between the base electrodes of first and second emitter-coupled transistors having base-emitter junctions with different $V_{BE}$ versus current characteristics. The collector currents of the first and the second transistors are caused to be in a predetermined ratio by a degenerative feedback loop which adjusts the value of the voltage to be regulated. Since the aforesaid fractional part of this voltage must vary linearly with the temperature change of the first and second transistors in order to maintain their collector currents equal, the voltage to be regulated must vary inversely as this fraction with that temperature change. The fractional part can be of fixed value, in which case the voltage to be regulated will vary linearly with the temperature change of the first and second transistors, or it can be changed from one value to another to cause the voltage to be regulated to vary in a more complex manner with temperature.

13 Claims, 12 Drawing Figures

TEMPERATURE-DEPENDENT VOLTAGE REFERENCE CIRCUIT

The present invention relates to a reference voltage circuit which provides a reference voltage which increases with the temperature of certain temperature-sensing transistors.

A reference voltage circuit which provides a reference voltage which varies linearly with the temperature of a sensing transistor is useful as a thermometer. A simple voltmeter connected to measure the reference voltage can serve as a read-out device and may be calibrated to give temperature readings directly. Reference voltage circuits providing reference voltages which vary predictably as a function of device temperatures also have wide application in compensating the operation of other electronic apparatus to give operating characteristics which exhibit controlled variation because of cooling or heating of the apparatus.

A reference voltage circuit was sought in which the determination of the reference voltage would not depend upon matching the temperature-dependent operating characteristics of different types of devices—a transistor and a resistor, for instance. Instead, it was desired that the reference voltage be provided by scaling from a comparison of the operating characteristics with temperature change of similar devices formed simultaneously by the same manufacturing process. Such circuits could then be mass produced without need for individual adjustments. This could, for example, provide a circuit which could be readily fabricated as a monolithic semiconductor integrated circuit using batch processing methods.

In reference voltage circuits, embodying the present invention, the reference voltage is provided by scaling from the difference in the base-emitter potentials which are supplied to first and second temperature sensing transistors by a feedback loop used to maintain the current densities in their base-emitter junctions unequal and in a predetermined desired proportion.

Figure 1:
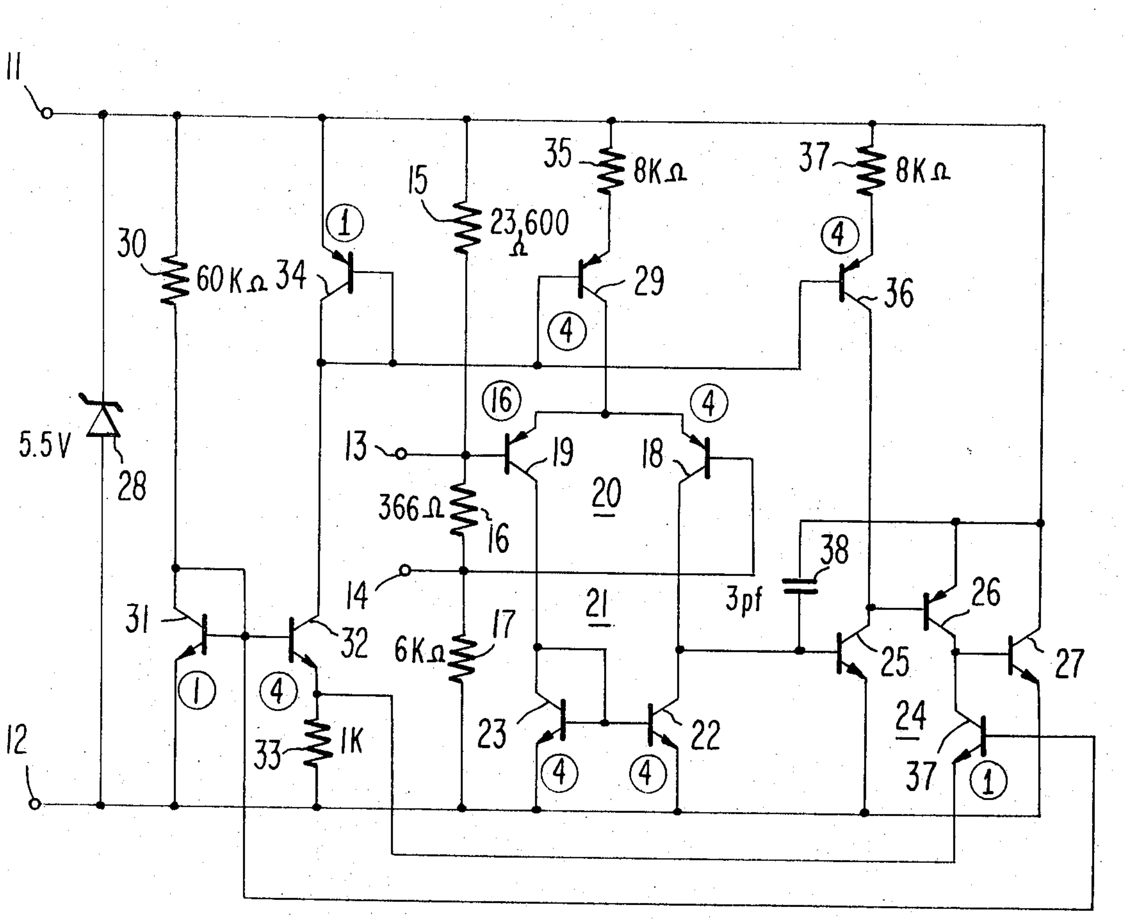
FIG. 1 is a schematic diagram of a basic reference voltage circuit, which embodies the present invention and is suitable for integration in a monolithic semiconductor integrated circuit.

In FIG. 1, a reference voltage circuit 10 will produce a temperature-dependent potential between its terminals 11 and 12, when a source of operating current (not shown) is connected between them. The source of operating current should have a sufficiently high source impedance to permit shunt regulation thereof and should be poled to maintain terminal 11 positive with respect to terminal 12. Reference circuit 10 is best suited for construction as a monolithic semiconductor integrated circuit, with substrate connected to terminal 12. The small size and good thermal conductivity associated with monolithic semiconductor integrated circuits means that the temperature of the whole circuit and of the devices therein can be quickly modified by exposure to a change in thermal environment.

A fraction $V_{13-14}$ of the potential $V_{11-12}$ appearing between terminals 11 and 12 appears between terminals 13 and 14 due to the resistive potential divider action of resistors 15, 16 and 17. Resistors 15, 16 and 17 have resistances $R_{15}$, $R_{16}$ and $R_{17}$, respectively. More precisely, $$V_{13-14} = R_{16}\, V_{11-12}/R_{15} + R_{16} + R_{17} \qquad (1)$$

This fractional potential $V_{13-14}$ is applied between the base electrodes of PNP transistors 19 and 18, which are connected in an emitter-coupled differential amplifier configuration 20.

The collector currents of transistors 18 and 19 are differentially compared, using a current amplifier 21 to invert the collector current of transistor 19 and add it to the collector current of transistor 18. The result of this differential comparison is an error signal current applied to the input circuit of the current amplifier 24. The output circuit of the current amplifier 24 amplifies the error signal current and applies it between the terminals 11 and 12. This effects a shunt regulation of the potential appearing between terminals 11 and 12 which attempts to reduce the amplified error signal current by degenerative feedback.

The amplified error signal current will be minimal only when the collector currents of transistors 18 and 19 are in correct proportion such that differential comparison of them will yield only a very small error signal. This condition is caused to correspond to a condition in which the density of current flow through the base-emitter junction of transistor 19 is smaller than the density of current flow through the base-emitter junction of transistor 18. For this latter condition to exist, the base-emitter potentials $V_{BE18}$ and $V_{BE19}$ of transistors 18 and 19, respectively, must differ by some amount $\Delta V_{BE}$. From the basic equations defining bipolar transistor action:

$$(V_{BE18} - V_{BE19}) = \Delta V_{BE} = kT/q \ \mathbf{1}n\ n, \qquad (2)$$

where $k$ is Boltzmann's constant,

T is absolute temperature, $q$ is the charge on an electron, and $n$ is the ratio of the density of current flowing through the base-emitter junction of transistor 18 with respect to the density of current flowing through the base-emitter junction of transistor 19.

At 300°K, $\Delta V_{BE}$ equals 26 1n $n$ millivolts. This $\Delta V_{BE}$ potential, which varies in direction proportional with temperature, determines the value of $V_{13-14}$ which must be supplied by the potential divider comprising resistors 15, 16 and 17. This potential divider determines the relationship of $V_{11-12}$ to $V_{13-14}$ and this determines the change of $V_{11-12}$ with temperature required to provide a $V_{13-14}$ which varies linearly $V_{11-12}$ with temperature to provide a $\Delta V_{BE}$ to reduce error signal in the degenerative feedback loop regulating $V_{11-12}$.

In the FIG. 1 circuit, the effective area of the base-emitter junction of transistor 19 is in 16:4 ratio with the effective area of the base-emitter junction of transistor 18. (Small circled numbers next to the base-emitter junctions of certain PNP transistors in FIG. 1 indicate their relative base-emitter junction areas. Similarly, small circled numbers next to the base-emitter junctions of certain NPN transistors indicate their relative base-emitter junction areas.) As shall be shown, the differential comparison of the collector currents of transistors 18 and 19 will cause an error signal which will operate to make these currents substantially equal. For equal collector current flows from transistors 18 and 19, their base-emitter junction currents (i.e., their emitter currents) will be equal. However, since the effective area of the base-emitter junction of transistor 19 is four times the effective area of the base-emitter junction of transistor 18, when their emitter currents are equal, the density of current flow through the base-emitter junction of transistor 18 will be four times as large as that through the base-emitter junction of transistor 19. That is, $n = 4$. So, $V_{13-14}$ should equal 36 millivolts at 300°K to make the collector currents $I_{C18}$ and $I_{C19}$ of transistors 18 and 19, respectively, to be equal. $I_{C18}$ will equal $I_{C19}$ when $V_{11-12}$ equals 3 volts for the values of $R_{15}$, $R_{16}$ and $R_{17}$ shown.

$I_{C19}$ is applied to the input terminal of a current amplifier 21 which has a current gain of approximately −1. The output terminal of current amplifier 21 is connected to the collector electrode of transistor 18, so that the inverted collector current of transistor 19, $-I_{C19}$, is added to $I_{C18}$, the collector current of transistor 18. The current amplifier 21 is shown as comprising a transistor 22 having its base emitter junction parallelled with a diode-connected transistor 23, which configuration is known to have a current gain nearly equal to −1, when transistors 22 and 23 have common-emitter forward current gains at least as high as normal (i.e., $h_{fe}$'s in excess of 30.) When $-I_{C19}$, the collector current of transistor 19 as inverted by current amplifier 21, equals $I_{C18}$, the collector current of transistor 18, then by Kirchoff's Current Law substantially no input current is provided to the input circuit of the following current amplifier 24. Amplifier 24 comprises common-emitter amplifier transistors 25, 26 and 27 connected in direct coupled cascade.

The output circuit of current amplifier 24 is connected between terminals 11 and 12. For the condition where $V_{13-14}$ is equal to or less than the $\Delta V_{BE}$ required to maintain $I_{C18}$ equal to $I_{C19}$, no input current of consequence will be supplied to the input circuit of current amplifier 24, and its output circuit will provide no current flow to attempt regulation of $V_{11-12}$. When $V_{13-14}$ as a fraction of $V_{11-12}$ tends to rise above the $\Delta V_{BE}$ required for equal $I_{C18}$ and $I_{C19}$, $I_{C18}$ supplied from transistor 18 will exceed $-I_{C19}$ as demanded by the output circuit of current amplifier 21. Therefore, input current of consequential magnitude will be supplied to the input circuit of current amplifier 24. This current amplified by the current gain of current amplifier 24, which ranges upward of 100,000, will act to divert operating current applied to terminals 11 and 12 and thereby reduce $V_{11-12}$. This completes the degenerative feedback loop which reduces $V_{11-12}$ until its fraction $V_{13-14}$ is substantially equal to the $\Delta V_{BE}$ required to make $I_{C18}$ equal to $I_{C19}$.

Now, as temperature rises from 300°K, $\Delta V_{BE}$ will increase linearly with temperature rise from its 36 millivolt value, per equation 2. Since the degenerative feedback loop will modify $V_{13-14}$ to provide a $\Delta V_{BE}$ which increases linearly with temperature rise and since $V_{13-14}$ is a fixed fraction of $V_{11-12}$, as determined according to equation 1, the degenerative feedback loop must permit $V_{11-12}$ to increase linearly with temperature rise. For the same reasons, as the temperature falls below 300°K, $\Delta V_{BE}$ will decrease linearly with temperature drop from its 36 millivolt value, per equation 2. The range of linear variation of $V_{11-12}$ with temperature change will extend over the entire operating temperature range of the integrated circuit. The circuit will operate with a $V_{11-12}$ of as little as 1.27 volts; which corresponds to a temperature of 127°K (−146°C).

Certain details of the particular circuit 10 will now be considered. Avalanche diode 28 connected between terminals 11 and 12 acts to suppress transient phenomena. Also, if a negative operating current is mistakenly caused to flow between terminals 11 and 12, diode 28 will be biased into forward conduction preventing the potential between terminals 11 and 12 from exceeding 0.7 volts. This avoids destructive break-down of other elements.

Despite the variation of $V_{11-12}$, the joined emitter electrodes of transistors 18 and 19 are supplied substantially constant current from the collector electrode of transistor 29. This is done by cascading stages each having a more or less logarithimic response to its applied input current.

Resistor 30 and diode-connected transistor 31 are serially connected between terminals 11 and 12. The collector-to-base connection of transistor 31 provides it with degenerative feedback to maintain its base-emitter potential ($V_{BE31}$) and its collector-emitter potential at about 0.65 volts for a silicon transistor. The potential drop across resistor 30 is equal to $R_{11-12} - V_{BE31}$. By Ohm's Law, this drop divided by the resistance $R_{30}$ of resistor 30 determines the collector current $I_{C31}$ of transistor 31.

$$I_{C31} = V_{11-12} - V_{BE31}/R_{30} \quad (3)$$

Transistor 31 maintains $I_{C31}$ at this value by virtue of its collector-to-base degenerative feedback, which value varies linearly and almost proportionally with $V_{11-12}$.

$V_{BE31}$ will vary logarithmically with $I_{C31}$. The logarithmic variation of the base-emitter offset potential of any bipolar transistor with its base, collector and emitter currents is well-known. If applied to a semiconductor junction, $V_{BE31}$ would cause a current flow therein linearly related to $I_{C31}$. If applied to a resistive element, $V_{BE31}$ would cause a logarithmic current in that resistive element. Resistor 33 has a resistance somewhat higher than the a-c resistance of the parallelled base-emitter junctions of transistors 32 and 37 as viewed from their emitter electrodes, and resistor 33 is serially connected with these parallelled junctions to receive $V_{BE31}$. Consequently, emitter current flows in the base-emitter junctions of transistors 32 and 37 and in the resistor 33 tend to be related to $I_{C31}$ somewhat more logarithmically than linearly. The collector current $I_{C37}$ of transistor 37 is—except for its negligibly small base current—equal in magnitude to its emitter current and therefore varies similarly with $I_{C31}$. The collector current $I_{C32}$ of transistor 32 is—except for its negligibly small base current—equal to its emitter current and therefore varies similarly with $I_{C31}$ in the same way.

$I_{C32}$ is withdrawn from the collector electrode of a transistor 34 which has collector-to-base degenerative feedback to regulate its conduction to accommodate the demand for $I_{C32}$. The base-emitter offset potential $V_{BE34}$ of transistor 34 will vary logarithmically with its collector current, which will equal $I_{C32}$ except for the contributions of the base currents of transistors 34, 29 and 36. Assuming transistors 34, 29 and 36 to have substantial common-emitter forward current gains (i.e., in excess of 30 or so), the base current contributions may be neglected. Transistor 34 cooperates with transistor 29 and resistor 35 in much the same manner as transistor 31 cooperates with transistors 32 and 37 and resistor 33 thereby to cause the collector current $I_{C29}$ of transistor 29 to vary somewhere between linearly and logarithmically with $I_{C32}$.

The base-emitter circuit of transistor 36, including its base-emitter junction and resistor 37 biased by $V_{BE34}$ corresponds exactly to the base-emitter circuit of transistor 29 including its base-emitter junction and resistor 35. The collector current of transistor 36, $I_{C36}$, responds to $I_{C32}$ in the same way as $I_{C29}$. Both $I_{C29}$ and $I_{C36}$ vary with $V_{11-12}$, then, somewhere between a linear function and a $\ln^2$ function—rather more the latter than the former. While not absolutely constant, $I_{C29}$ and $I_{C36}$ do not vary greatly as $V_{11-12}$ increases with temperature.

Transistor 32 has a larger area base-emitter junction than transistor 31 (4 to 1 ratio) to keep $I_{C32}/I_{C31}$ from becoming too small because of the inclusion of the emitter degeneration resistor 33 in the emitter circuit of transistor 32. At 300°K, with $I_{C31}$ approximately equal to 50 microamperes, $I_{C32}$ and $I_{C34}$ will be approximately 50 microamperes also. Transistors 29 and 36 have larger area microamperes also. Transistors 29 and 36 have larger area base-emitter junctions than transistor 34 to keep $I_{C29}/I_{C34}$ and $I_{C36}/I_{C34}$ from becoming too small because of resistors 35 and 37 reducing conduction in transistors 29 and 36, respectively. Under these conditions cited immediately above, $I_{C29}$ and $I_{C36}$ each equal approximately 10 microamperes over the normal range of $V_{11-12}$.

The current gain of the current amplifier 21 is not quite exactly -1. The collector current of transistor 19 does not flow entirely as the collector current $I_{C23}$ of transistor 23. The base currents of transistors 22 and 23 ($I_{B22}$ and $I_{B23}$, respectively) are also supplied from the collector current of transistor 19. The current gain $G_{21}$ of current amplifier 21 can be expressed as follows:

$$G_{21} = -I_{C22}/I_{C23} + I_{B22} + I_{B23} \qquad (4)$$

Assume transistors 22 and 23 to be identically alike, an assumption which is in close agreement with actuality. $I_{C22}$, the collector current of transistor 22, and $I_{C23}$ will be larger than their respective base currents $I_{B22}$ and $I_{B23}$, by the same factor, $h_{feNPN}$, which is equal to their common-emitter forward current gains.

$$G_{21} = -h_{fe}\, I_{B22}/h_{fe}\, I_{B23} + I_{B22} + I_{B23} \qquad (5)$$

The corresponding currents of transistors 22 and 23 should be equal since their base-emitter offset voltages are maintained equal by the parallel connection of their baseemitter junctions.

$$G_{21} = -h_{feNPN}\, I_{B23}/h_{feNPN}\, I_{B23} + I_{B23} + I_{B23} = -h_{feNPN}/(h_{feNPN} + 2) \qquad (6)$$

When the collector current of transistor 19 equals the collector current of transistor 18, the addition of the collector current of transistor 22 to the collector current of transistor 18 will yield a surplus current, equal to $I_{B22} + I_{B23}$, to flow as base current to transistor 25.

This current is just insufficiently large enough to cause current to flow in the output circuit of current amplifier 24, however. The base current supplied to transistor 25 must suffice to cause the collector current demanded by transistor 25 to exceed the collector current supplied from transistor 36 before the base current will be drawn from transistor 26. Only in response to current being withdrawn from its base electrode will transistor 26 supply sufficient collector current to overcome the collector current of pull-down transistor 37 and apply base current to transistor 27. Only in response to base current supplied from the collector electrode of transistor 26 will transistor 27 be biased into conduction and caused to draw collector current to reduce $V_{11-12}$.

Transistor 25 has a common-emitter forward current gain, $h_{feNPN}$, equal to that of transistors 22 and 23. Supplying a base current equal to $I_{B22} + I_{B23}$ to transistor 25 will cause it to have a collector current $h_{feNPN}$ ($I_{B22} + I_{B23}$). This is a collector current flow in transistor 25 equal to $h_{feNPN}\, I_{B22} + h_{feNPN}\, I_{B23}$, the sum of the collector currents of transistors 22 and 23. The sum of the collector currents of transistors 22 and 23 is substantially equal to the sum of the collector currents of transistors 18 and 19. Assuming transistors 18 and 19 to have substantial common-emitter forward current gains ($h_{fe}$'s) their combined collector currents will be negligibly smaller than their combined emitter currents, which are supplied by the collector current of transistor 29. Thus, the collector current of transistor 25 will be substantially the same magnitude, when the collector currents of transistors 18 and 19 are equal, as the magnitude of the collector current of transistor 29. More precisely speaking, the collector current of transistor 25 will be $h_{fePNP}/(h_{fePNP} + 1)$ times as large as the collector current of transistor 29, when the desired condition of equal collector currents for transistors 18 and 19 obtains.

Transistor 36 has its base-emitter current biased in the same way as does transistor 29, so its collector current will be of the same magnitude as the collector current of transistor 29. The collector current of transistor 25 will have to increase by a factor $(h_{fePNP} + 1)/h_{fePNP}$ in order for it to become large enough to withdraw base current from transistor 26. Since $h_{fePNP}$ normally exceeds 30, somewhat less than a 3 percent increase in the collector current of transistor 25 will suffice to initiate conduction in transistors 26 and 27 and thereby institute regulation of $V_{11-12}$. A much smaller percentage change in the collector currents of transistors 22 and 23 suffices to bring about this increase in the currents of transistors 25. This is because of the common mode rejection provided when the differential amplifier 20 is connected with current amplifier 21.

Capacitor 38 is used to control the phase response characteristic of amplifier 24 so as to meet the nyquist stability criteria in the regulator-degenerative feedback loop.

Figure 2:
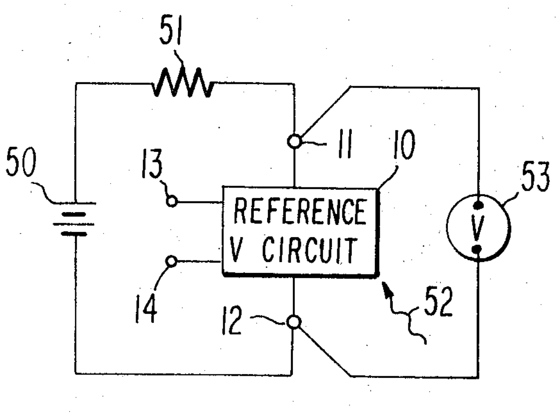
FIG. 2 is a schematic diagram, partially in block form, depicting a connection of the FIG. 1 reference voltage circuit to provide a reference voltage varying linearly with the temperature of sensing.
Figure 3:
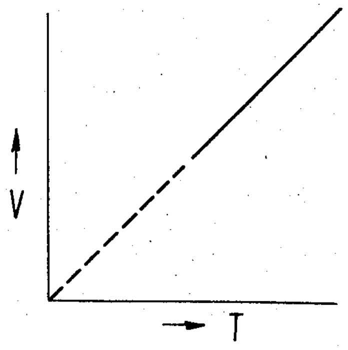
FIG. 3 is the reference voltage versus temperature characteristics of the FIG. 2 connection.

FIG. 2 shows the reference voltage circuit 10 connected in circuit with a battery 50 and a resistive element 51, which element 51 is of sufficiently high resistance to permit circuit 10 to regulate the voltage $V_{11-12}$ appearing between its terminals 11 and 12. Thermal energy 52 impinges upon the circuit 10 to heat it. A voltmeter 53, connected to terminals 11 and 12, as shown, will exhibit voltage readings (V) versus the temperature of circuit 10 (T) as shown in FIG. 3. The voltage reading varies linearly with the temperature of circuit 10, exhibiting no change in slope over the operating range of the circuit 10. This is because the resistive potential divider formed by resistors 15, 16 and 17 in the circuit 10 proportion $V_{11-12}$ in fixed ratio to the $\Delta V_{BE}$ required to maintain $I_{C18}$ equal to $I_{C19}$, which $\Delta V_{BE}$ varies linearly with the temperature of transistors 18 and 19. An advantage of the circuit 10 is that is is a two-terminal device with no requirement for separate operating supply connections.

FIGS. 4, 6, 8 and 10 show different modifications of the FIG. 2 configuration which can be made to affect the voltage versus temperature characteristic of the circuit. FIGS. 5, 7, 9 and 11 show the modified voltage versus temperature characteristics which will be obtained using the FIGS. 4, 6, 8 and 10 configurations, respectively. These modifications introduce a scaling factor into the resistive potential divider formed by resistors 15, 16 and 17 which changes when a certain preset threshold value of $V_{11-13}$, $V_{14-12}$, $V_{13-12}$ or $V_{11-14}$ is exceeded. ($V_{11-13}$ is the potential between terminals 11 and 13; $V_{14-12}$, the potential between terminals 14 and 12; $V_{13-12}$, the potential between terminals 13 and 12; $V_{11-14}$, the potentials between terminals 11 and 14.) The threshold value of potential (64; 74; 84; 94, respectively) is shown as being determined by a battery (62, 72, 82, 92, respectively) and the forward offset potential of a diode (61, 71, 81, 91, respectively). The battery (62, 72, 82, 92) provides a lower potential than that provided by battery 50. When the threshold potential (64, 74, 84, 94) is exceeded, the diode (61, 71, 81, 91) becomes conductive and the resistor (63, 73, 83, 93) shunts a portion of the resistive potential divider formed by resistors 15, 16, and 17 to alter the slope of the voltage versus temperature characteristic of the device once the threshold voltage (64, 74, 84, 94) is exceeded. Each threshold voltage (64, 74, 84, 94, respectively) will be reached at an associated threshold temperature (65, 75, 85, 95, respectively).

Any one of the modifications can be used iteratively with different potential for each battery and different resistances for each resistor to obtain a characteristic which provides a piece-wise linear approximation of a desired voltage versus temperature characteristic. The modification of FIG. 4 or of FIG. 6 can be combined with the modification of FIG. 8 or of FIG. 10 using different threshold temperatures thereby to attenuate or to increase the voltage response to temperature change over a selected intermediate range. Alternative known means of changing the scaling factor of a potential divider as a function of potentials appearing across all or a portion of it will suggest themselves to one skilled in the art and the use of such means for such purpose is within the scope of the present invention as set forth in those claims including a potential divider.

Figure 12:
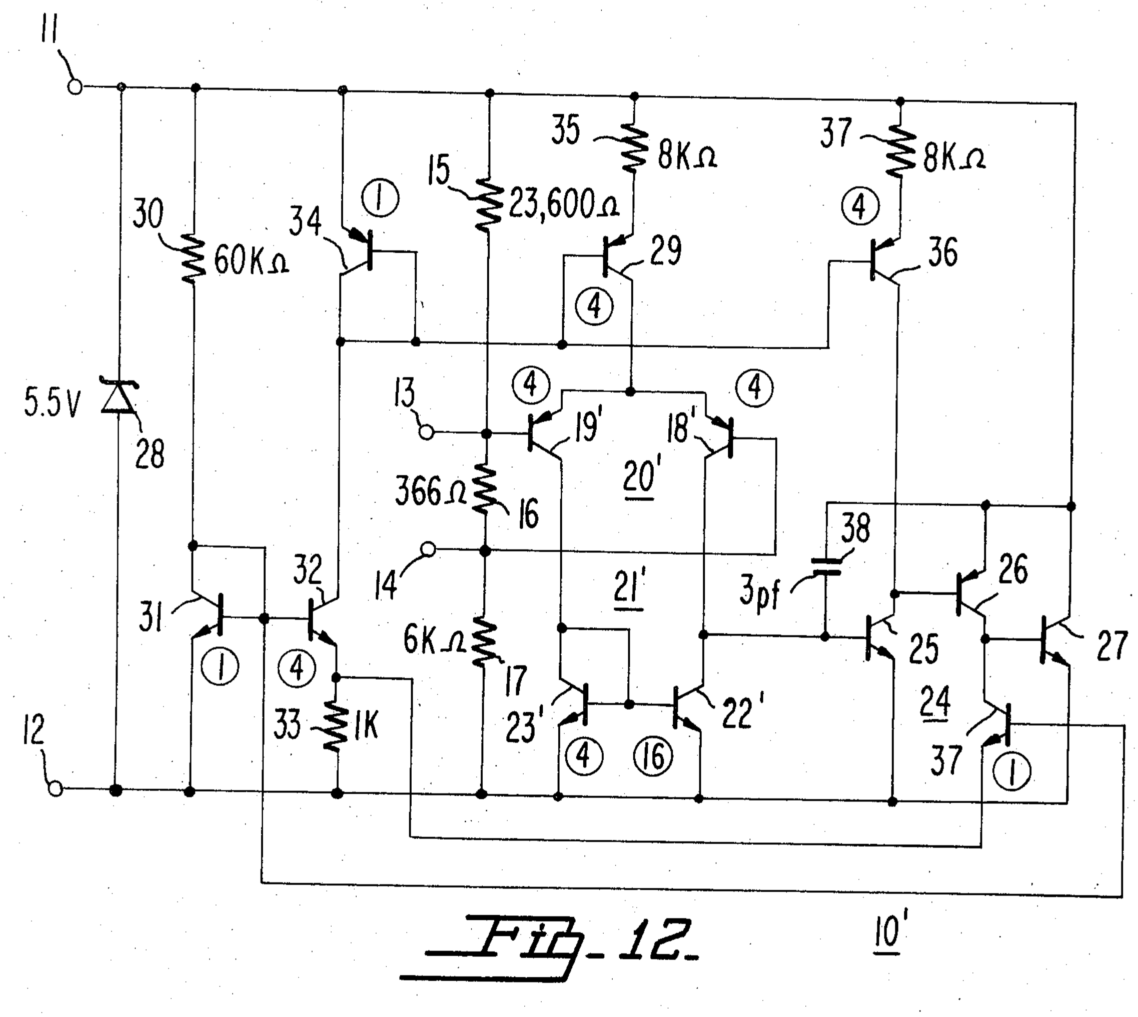
FIG. 12 is a schematic diagram of a basic reference voltage circuit, which is an alternative embodiment of the present invention.

FIG. 12 shows an alternative to the FIG. 1 configuration. Current amplifier 21' has a current gain of -4, since transistor 22' is made to have an effective base-emitter junction area four times as large as that of transistor 23'. Consequently, current amplifier 25 will effect shunt regulation of $V_{11-12}$ until $I_{C19'}$ is made one quarter as large as $I_{C18'}$. The emitter current of transistor 19' is one-quarter that of transistor 18' for this case. Transistors 18' and 19' are made alike and have base-emitter junctions having equal areas. So the density of current flow in transistor 18' is four times as large as that of transistor 19'. That is, $n = 4$ when the amplified error signal current is reduced by the high-gain degenerative feedback loop of the voltage regulator. This results in $V_{13-14}$ equalling a 36 millivolt $\Delta V_{BE}$, as was the case in the FIG. 1 configuration. $V_{11-12}$ varies with temperature in each of the FIGS. 1 and 12 configurations in much the same way.

Both configurations operate similarly. Certain $V_{BE}$ potentials are applied by degenerative feedback to first and second temperature sensing transistors so as to proportion their emitter-to-collector currents in a predetermined ratio. To accomplish this proportioning, these $V_{BE}$ potentials are required to be different by a potential difference $\Delta V_{BE}$, which varies directly proportionally to temperature. By scaling from this $\Delta V_{BE}$ potential with known variation with temperature a variety of temperature-dependent voltages can be obtained.

Figure 4:
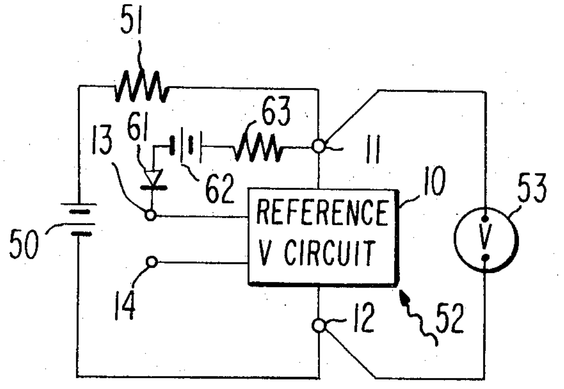
FIGS. 4, 6, 8 and 10 are schematic diagrams, partially in block form, depicting connections of the FIG. 1 reference voltage circuit to provide respective reference voltages each varying in non-linear proportion with temperature.
Figure 5:
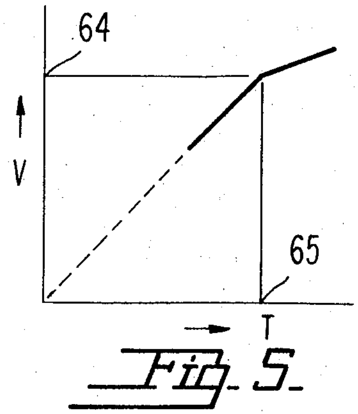
FIGS. 5, 7, 9 and 11 are their respective reference voltage versus temperature characteristics.
Figure 6:
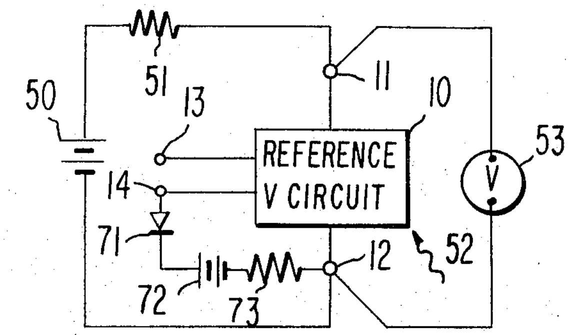
Figure 7:
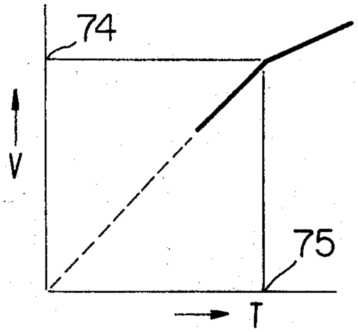
Figure 8:
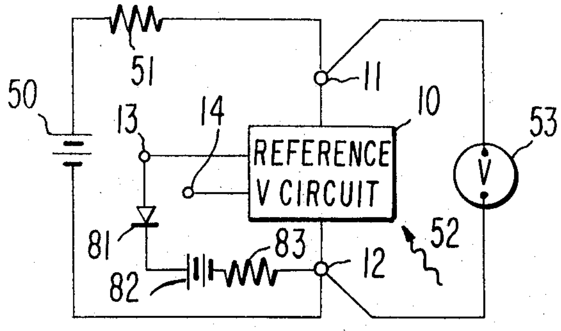
Figure 9:
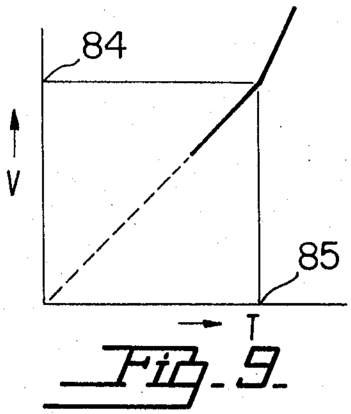
Figures 10, 11:
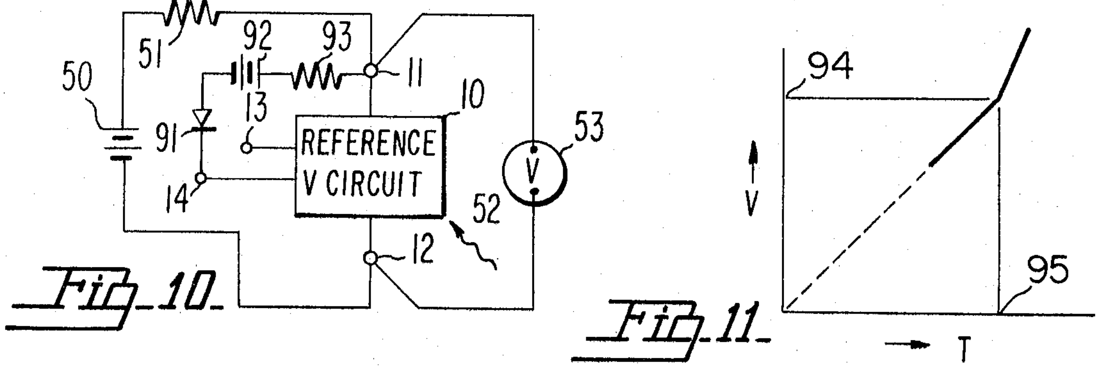

Configurations in which transistors 18 and 19 have different base-emitter junction geometries and transistors 22 and 23 have different base-emitter junction geometries can also be fabricated and caused to operate according to the operating principals used in the FIGS. 1 and 4 configurations.

What is claimed is:

1. In combination:

a first and a second input terminal between which a temperature-dependent reference voltage is produced;

a first and a second transistor of the same conductivity type, each operated at substantially the same temperature upon which temperature said reference voltage depends, each of said first and said second transistors having a base and an emitter electrode and a base-emitter junction therebetween and each having a collector electrode;

a potential divider having an input circuit connected between said first and said second input terminals and having an output circuit connected between the base electrodes of said first and said second transistors;

means for supplying an operating current flow between said first and said second input terminals;

means for conducting a portion of said operating current from said first input terminal to the joined emitter electrodes of said first and said second transistors;

a first current amplifier having an input terminal connected to said first transistor collector electrode, having a common terminal connected to said second input terminal, having an output terminal connected to said second transistor collector electrode, and having an inverting or negative current gain between its said input and output terminals; and a second current amplifier having an input terminal connected to said first current amplifier output terminal and having a common and an output terminal connected to separate ones of said first and said second input terminals;

a degenerative feedback loop being formed by the aforesaid connections, which operates to maintain the densities of current flow through the base-emitter junctions of said first and said second transistors in a predetermined ratio other than unity.

2. The combination set forth in claim 1 wherein:
said first and said second transistors have dissimilar base-emitter junctions causing their respective emitter current versus base-emitter voltage characteristics to differ from each other, and
said first current amplifier has a current gain of substantially minus unity.

3. The combination set forth in claim 1 wherein:
said first and said second transistors have base-emitter junctions which are alike and have like emitter current versus base-emitter voltage characteristics, and
said first current amplifier has a current gain other than minus unity.

4. A circuit for producing between a first and a second input terminals a voltage of interest comprising:
a source of operating current connected between said first and said second input terminals;
first and second transistors of the same conductivity type, each operated at substantially the same temperature upon which temperature said voltage of interest depends, each of said first and said second transistors having a base electrode and an emitter electrode with a base-emitter junction therebetween and having a collector electrode;
means for conducting a first portion of said operating current, which means is connected between said first input terminal and the joined emitter electrodes of said first and said second transistors;
means responsive to said voltage of interest to provide a potential difference which is applied between the base electrodes of said first and said second transistors to cause collector current flows in said first and said second transistors in a prescribed proportion corresponding to unequal densities of emitter current flow through their respective base-emitter junctions;
means coupled to each of the collector electrodes of said first and said second transistors to sense their collector currents and responsive to any tendency for these collector currents to depart from their prescribed proportion for altering said voltage of interest to counteract said tendency, whereby said potential difference varies proportionally with said temperature and said voltage of interest varies directly though not necessarily proportionally with said temperature.

5. A circuit as claimed in claim 4 wherein said means responsive to said voltage of interest to provide a potential difference comprises:
a first resistive element connected between said base electrodes of said first and said second transistors and
at least a first further resistive element connected in serial combination with said first resistive element between said first and said second input terminals.

6. A circuit as claimed in claim 5 having:
a device with a conduction threshold; and
an additional resistive element connected serially therewith between one of the base electrodes of said first and said second transistors and the end of said first further resistive element remote from said first resistive element.

7. A circuit as claimed in claim 4 wherein said means responsive to said voltage of interest to provide a potential difference comprises:
a first resistive element connecting said first input terminal and said first transistor base electrode;
a second resistive element connecting said first transistor base electrode and said second transistor base electrode; and
a third resistive element connecting said second transistor base electrode and said second input terminal.

8. A circuit as claimed in claim 4 wherein said means to sense collector currents and for altering said voltage of interest to counteract any tendency for them to depart from their prescribed proportion includes:
an inverting current amplifier having an input circuit and an output circuit to which the collector electrodes of said first and said second transistors are respectively connected, said current amplifier having a current gain of magnitude equal to said prescribed proportion; and
another amplifier having an input circuit coupled to the output circuit of the aforesaid current amplifier and having an output circuit coupled to said first and said second terminals.

9. A circuit as claimed in claim 8 wherein said inverting current amplifier comprises:
a third and a fourth transistor of a conductivity type complementary to that of said first and said second transistors, each having a base and an emitter electrode with a base-emitter junction therebetween and each having a collector electrode, the collector electrodes of said third and said fourth transistors being connected respectively to the collector electrodes of said first and said second transistors, the base electrodes of said third and said fourth transistors being connected to said third transistor collector electrode, and the emitter electrodes of said third and said fourth transistors being connected to said second input terminal.

10. A circuit as claimed in claim 9 wherein:
a fifth transistor of the same conductivity type as said third and said fourth transistors is included as a common-emitter amplifier stage in said another amplifier, said fifth transistor having a base and an emitter electrode with a base-emitter junction therebetween and having a collector electrode, said fifth transistor base electrode being connected to the collector electrodes of said second and said fourth transistors to receive the difference in their collector currents, and said fifth transistor emitter electrode being connected to said second input terminal, and
means for conducting a second portion of said operating current which is substantially equal to said first portion is connected between said first input terminal and said fifth transistor collector electrode.

11. Reference voltage circuit for providing at least a first temperature-dependent reference voltage comprising:
first and second transistors of the same conductivity type, each operated at substantially the same temperature upon which temperature said reference voltage depends, each having a base electrode and an emitter electrode with a base-emitter junction therebetween and each having a collector electrode, said first transistor base-emitter junction being characterized by a larger emitter current flow for any given base-emitter potential than said second transistor base-emitter junction;

means connected to the emitter electrodes of said first and said second transistors to maintain them at the same potential;

means connected to the collector electrodes of each of said first and said second transistors for receiving their respective collector currents and comparing them to develop a signal proportional to the difference between them and;

means for applying said signal between the base electrodes of said first and said second transistors, to complete a degenerative feedback loop for said signal.

12. Reference voltage circuit as claimed in claim 11 wherein said means for applying said signal includes:

a potential divider having an output circuit connected between the base electrodes of said first and said second transistors and having an input circuit connected to receive said signal whereby said signal is a second temperature-dependent reference voltage scaled up from said first temperature-dependent reference voltage by the voltage division ratio of said potential divider.

13. In combination:

means for supplying a reference potential;

means for supplying a first and a second current, which currents are substantially equal to each other;

a first and a second transistor of a first conductivity type, each having a principal conduction path between a first and a second electrode and having a control electrode for controlling the conductance of its said principal conduction path, the first electrodes of said first and said second transistors being connected together and connected to said means for supplying a first and a second currents to receive said first current;

a third and a fourth and a fifth transistor of a second conductivity type complementary to said first conductivity type, each having a base and a collector electrode, all having emitter electrodes interconnected and connected to said means for supplying a reference potential; said third and said fourth transistor collector electrodes being respectively connected to separate ones of the second electrodes of said first and said second transistors, said fifth transistor collector electrode being connected to said means for supplying a first and a second currents to receive said second current, said base electrodes of said third and said fourth transistors each being coupled to said third transistor collector electrode, said fifth transistor base electrode being coupled to said fourth transistor collector electrode;

means for supplying an input signal potential referred to said reference potential, which input signal is applied between the control electrodes of said first and said second transistors; and means connected to said fifth transistor collector electrode to sense whether or not the collector current flow of said fifth transistor exceeds said second current in magnitude.

* * * * *